(12) United States Patent
Furukawa et al.

(10) Patent No.: US 12,394,975 B2
(45) Date of Patent: Aug. 19, 2025

(54) INTERRUPTION DEVICE (71) Applicant: Panasonic Intellectual Property Management Co., Ltd., Osaka (JP)

(72) Inventors: Mima Furukawa, Osaka (JP); Hideki Iwaki, Osaka (JP); Eiichi Sadayuki, Osaka (JP); Tomoaki Furuse, Osaka (JP); Kenjiro Kumazawa, Tokyo (JP); Shinya Saito, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 18/564,075

(22) PCT Filed: Apr. 25, 2022

(86) PCT No.: PCT/JP2022/018664
§ 371 (c)(1),
(2) Date: Nov. 25, 2023

(87) PCT Pub. No.: WO2022/264690
PCT Pub. Date: Dec. 22, 2022

(65) Prior Publication Data
US 2024/0258790 A1    Aug. 1, 2024

(30) Foreign Application Priority Data
Jun. 14, 2021 (JP) ................... 2021-098390

(51) Int. Cl.
H02H 5/04 (2006.01)
(52) U.S. Cl.
CPC ................. *H02H 5/047* (2013.01)

(58) Field of Classification Search
CPC ........... H01H 9/54; H02H 1/06; H02H 3/044; H02H 3/05; H02H 3/08; H02H 5/041; H02H 5/047
(Continued)

(56) References Cited

U.S. PATENT DOCUMENTS

| 2019/0123542 A1* | 4/2019 | Kambham | ........... H01H 39/006 |
| 2021/0142969 A1* | 5/2021 | Bush | .................... H01H 50/546 |
| 2022/0029415 A1* | 1/2022 | Steinberger | .......... H01H 33/596 |

FOREIGN PATENT DOCUMENTS

| JP | 2015195683 A | * 11/2015 |
| WO | 2019/084304 | 5/2019 |

OTHER PUBLICATIONS

Machine translation of Takabayashi et al. Japanese Patent Document JP 2015-195683 A Nov. 2015 (Year: 2015).*

(Continued)

*Primary Examiner* — Kevin J Comber
(74) *Attorney, Agent, or Firm* — GREENBLUM & BERNSTEIN, P.L.C.

(57) ABSTRACT

A cutoff device includes a conductor wire, a pyrotechnic circuit breaker, a plurality of drive circuits connected to the pyrotechnic circuit breaker in parallel and configured to activate the pyrotechnic circuit breaker, and a control circuit. The control circuit sets an output current value and a period for which the output current is output to each of the drive circuits, and causes the drive circuits to supply the power for activating the pyrotechnic circuit breaker when the pyrotechnic circuit breaker needs to be activated.

13 Claims, 3 Drawing Sheets

(58) Field of Classification Search
USPC .......................................................... 361/104
See application file for complete search history.

(56) References Cited

OTHER PUBLICATIONS

International Search Report of PCT application No. PCT/JP2022/018664 dated Jun. 28, 2022.

* cited by examiner

INTERRUPTION DEVICE

TECHNICAL FIELD

The present disclosure relates to a cutoff device used in various electric devices for a vehicle.

BACKGROUND ART

A conventional cutoff device will be explained below. A conventional cutoff device includes a pyrofuse and a pyrofuse drive circuit. In particular, such a pyrofuse drive circuit is provided with a plurality of current detectors, and, by comparing the current values detected by the respective current detectors, the cutoff device determines a fault in the current detectors or suppresses malfunctioning of the pyrofuse drive circuit.

As a prior art document containing information related to the invention according to this application, PTL 1 is known, for example.

CITATION LIST

Patent Literature

PTL 1: WO 2019/084304 A

SUMMARY OF THE INVENTION

Such a conventional cutoff device can determine or make a diagnosis of a fault in each of the current detectors included in the pyrofuse drive circuit, and the pyrofuse drive circuit can continue its operation without using the information from the faulty current detector. However, there has been a problem that, when the pyrofuse drive circuit itself is not being driven appropriately, reliability of the operation of the cutoff device may deteriorate.

The present disclosure provides: a conductor wire; a pyrotechnic circuit breaker configured to cut off the conductor wire irreversibly; a plurality of drive circuits connected to the pyrotechnic circuit breaker in parallel, and configured to supply power for activating the pyrotechnic circuit breaker; and a control circuit configured to control operations of the plurality of drive circuits, in which the control circuit is configured, when the pyrotechnic circuit breaker needs to be activated, to set an output current value and a period for which the output current is output, for each of the plurality of drive circuits, and to cause the plurality of drive circuits to supply power for activating the pyrotechnic circuit breaker.

According to the present disclosure, the plurality of drive circuits for activating the pyrotechnic circuit breaker are provided, and the drive circuits are connected to the pyrotechnic circuit breaker in parallel. Therefore, even if any of the drive circuits fails, the pyrotechnic circuit breaker can be activated highly reliably, because the drive circuits are deployed redundantly. Furthermore, the plurality of individual drive circuits can be set with different output currents and different periods for which the output current is output, and therefore, the plurality of drive circuits can supply power to the pyrotechnic circuit breaker in a manner suitable for the circumstances. As a result, it is possible to improve the reliability of the operation of the cutoff device.

DESCRIPTION OF EMBODIMENT

An exemplary embodiment of the present disclosure will now be explained with reference to drawings.

Exemplary Embodiment

Figure 1:
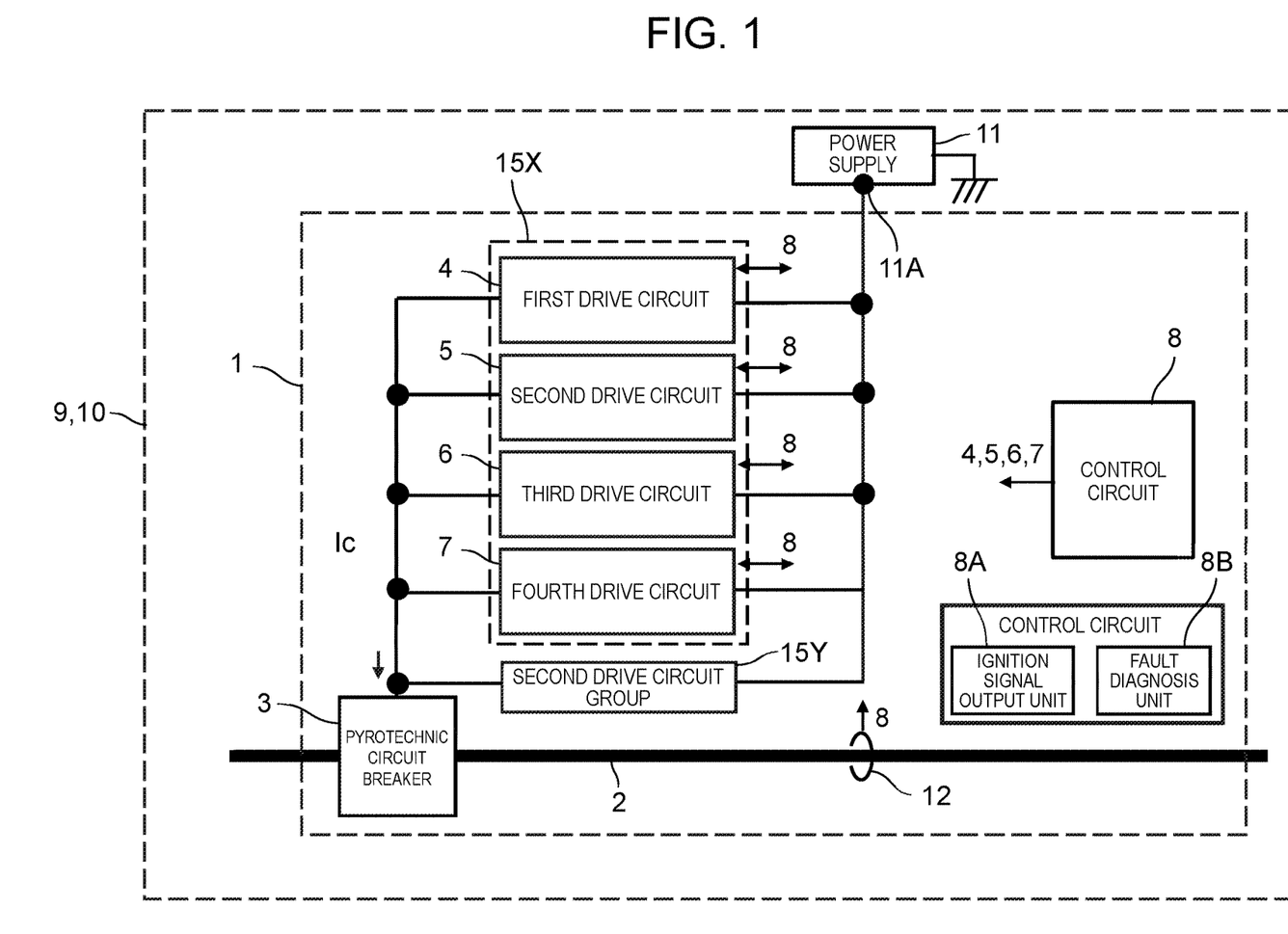
FIG. 1 is a first circuit block diagram illustrating a configuration of a cutoff device according to an exemplary embodiment of the present disclosure.

FIG. 1 is a first circuit block diagram illustrating a configuration of a cutoff device according to an exemplary embodiment of the present disclosure. Cutoff device 1 includes conductor wire 2, pyrotechnic circuit breaker 3, and first drive circuit 4, second drive circuit 5, third drive circuit 6, and fourth drive circuit 7 that are a plurality of drive circuits, and control circuit 8. Pyrotechnic circuit breaker 3 is capable of irreversibly cutting off conductor wire 2. First drive circuit 4, second drive circuit 5, third drive circuit 6, and fourth drive circuit 7 provided to pyrotechnic circuit breaker 3 in parallel are capable of supplying power for activating pyrotechnic circuit breaker 3. Control circuit 8 is capable of controlling operations of first drive circuit 4, second drive circuit 5, third drive circuit 6, and fourth drive circuit 7.

Control circuit 8 causes first drive circuit 4, second drive circuit 5, third drive circuit 6, fourth drive circuit 7 to supply the power for activating pyrotechnic circuit breaker 3, when pyrotechnic circuit breaker 3 needs to be activated. Control circuit 8 can control an output current value and a period for which the current is output, for each of first drive circuit 4, second drive circuit 5, third drive circuit 6, and fourth drive circuit 7.

With the configuration and the operation described above, first drive circuit 4, second drive circuit 5, third drive circuit 6, and fourth drive circuit 7 that are a plurality of drive circuits are provided to activate pyrotechnic circuit breaker 3, and first drive circuit 4, second drive circuit 5, third drive circuit 6, and fourth drive circuit 7 are connected to pyrotechnic circuit breaker in parallel. Therefore, even if any of first drive circuit 4, second drive circuit 5, third drive circuit 6, and fourth drive circuit 7 fails, first drive circuit 4, second drive circuit 5, third drive circuit 6, and fourth drive circuit 7 maintain the redundancy. Thus, pyrotechnic circuit breaker 3 can be activated highly reliably. Furthermore, control circuit 8 can control the output current and the period for which the output current is output, for each of first drive circuit 4, second drive circuit 5, third drive circuit 6, and fourth drive circuit 7, and also set a different output current and period for which the output current is output, to each of first drive circuit 4, second drive circuit 5, third drive circuit 6, and fourth drive circuit 7. In other words, first drive circuit 4, second drive circuit 5, third drive circuit 6, and fourth drive circuit 7 can supply power to pyrotechnic circuit breaker 3 in a manner suitable for the circumstances. In this manner, it becomes possible to improve the reliability of the operation of cutoff device 1.

Figure 2:
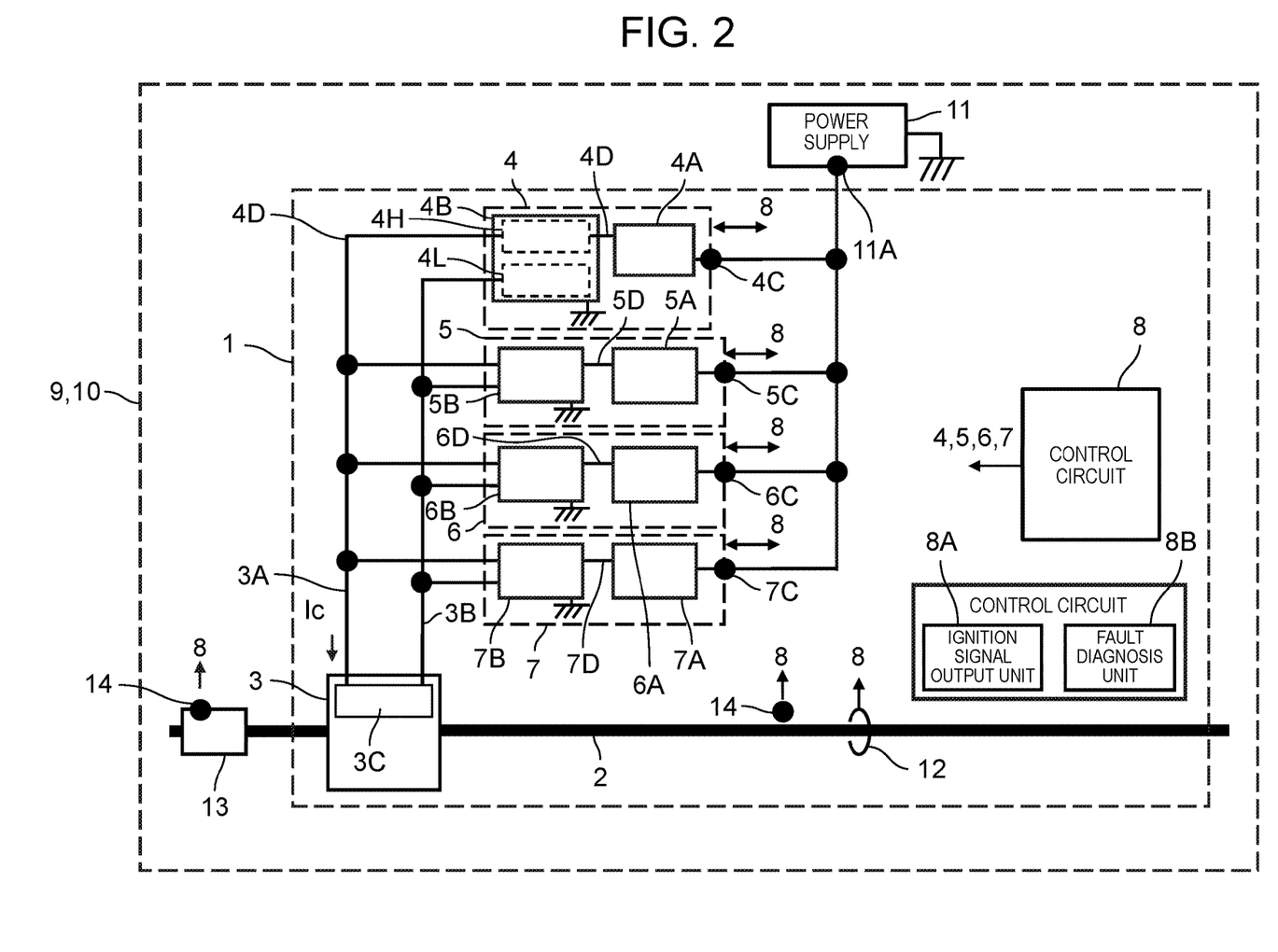
FIG. 2 is a second circuit block diagram illustrating the configuration of the cutoff device according to the exemplary embodiment of the present disclosure.
Figure 3:
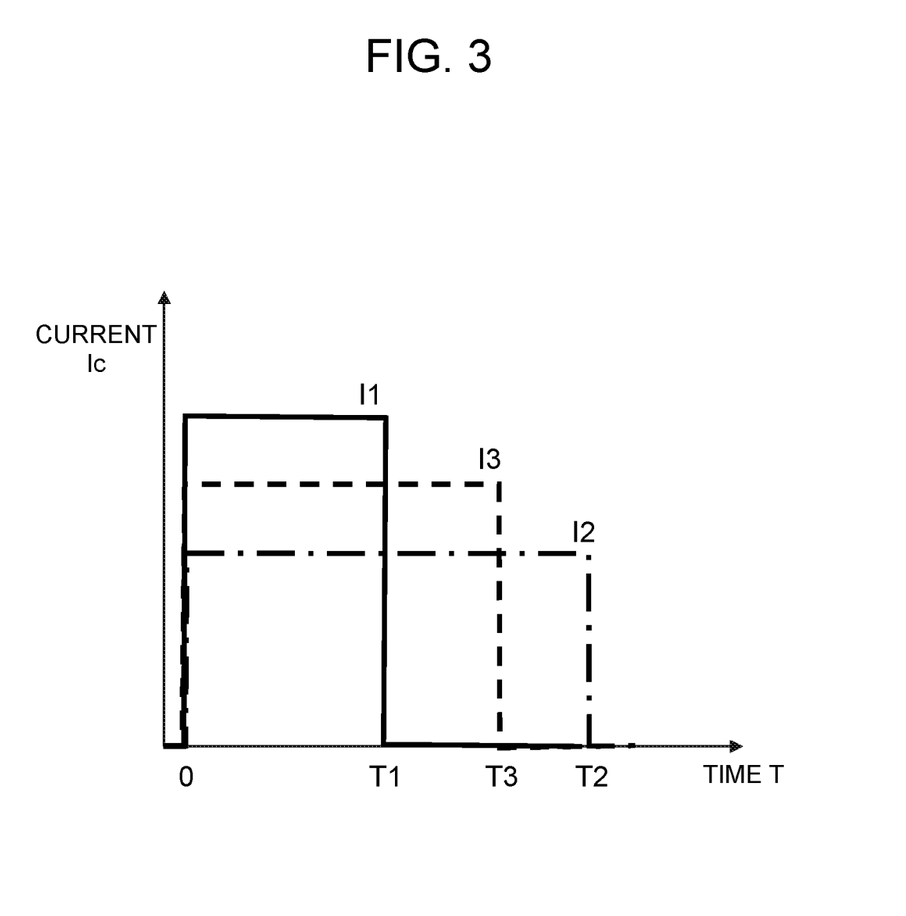
FIG. 3 is an operation curve diagram of the cutoff device according to the exemplary embodiment of the present disclosure.

Cutoff device 1 will now be explained in detail, with reference to FIG. 1, FIG. 2 illustrating a second circuit block diagram of the configuration of the cutoff device according to the exemplary embodiment of the present disclosure, and FIG. 3 illustrating an operation curve diagram of the cutoff device according to the embodiment of the present disclosure.

Cutoff device 1 includes conductor wire 2, pyrotechnic circuit breaker 3, and first drive circuit 4, second drive circuit 5, third drive circuit 6, and fourth drive circuit 7 that are a plurality of drive circuits, and control circuit 8. Cutoff device 1 is mounted on vehicle body 10 of vehicle 9. Power supply 11 supplies the power for causing first drive circuit 4, second drive circuit 5, third drive circuit 6, fourth drive circuit 7, and control circuit 8 to operate.

In the example illustrated in FIGS. 1 and 2, power supply 11 is mounted on vehicle body 10; however, it is also possible to include power supply 11 in cutoff device 1. Power supply 11 is a capacitor or a storage battery storing therein power resultant of boosting the power supplied by a vehicle battery (not illustrated). Power supply 11 may also be a power supply unit including a capacitor or a storage battery. It is preferable to use a capacitor capable of supplying power at a high current density as power supply 11, because the responsiveness of the operation is important for cutoff device 1.

Conductor wire 2 is provided to supply power of a driving power supply for propelling the vehicle (not illustrated) to a driven load for propelling the vehicle (not illustrated). Current detector 12 capable of detecting the value of current flowing through conductor wire 2 is provided to vehicle body 10 or cutoff device 1, for example. When control circuit 8 detects an overcurrent via current detector 12, control circuit 8 drives pyrotechnic circuit breaker 3 using all or some of first drive circuit 4, second drive circuit 5, third drive circuit 6, and fourth drive circuit 7. By driving pyrotechnic circuit breaker 3, conductor wire 2 is physically cut off and irreversibly cut off.

First drive circuit 4, second drive circuit 5, third drive circuit 6, and fourth drive circuit 7 are provided in a manner connected in parallel to pyrotechnic circuit breaker 3. Each of first drive circuit 4, second drive circuit 5, third drive circuit 6, and fourth drive circuit 7 is capable of supplying power for activating one pyrotechnic circuit breaker 3.

Control circuit 8 can control the operations of first drive circuit 4, second drive circuit 5, third drive circuit 6, and fourth drive circuit 7. As described above, when pyrotechnic circuit breaker 3 needs to be activated, e.g., when an overcurrent is detected, control circuit 8 causes first drive circuit 4, second drive circuit 5, third drive circuit 6, or fourth drive circuit 7 to supply power for activating pyrotechnic circuit breaker 3. Control circuit 8 can control an output current value and a period for which the current is output, for each of first drive circuit 4, second drive circuit 5, third drive circuit 6, and fourth drive circuit 7.

Pyrotechnic circuit breaker 3 is provided to ensure the safety of vehicle 9. Even if any of first drive circuit 4, second drive circuit 5, third drive circuit 6, and fourth drive circuit 7 fails, first drive circuit 4, second drive circuit 5, third drive circuit 6, and fourth drive circuit 7 maintain the redundancy. Thus, pyrotechnic circuit breaker 3 can be activated highly reliably. First drive circuit 4, second drive circuit 5, third drive circuit 6, and fourth drive circuit 7 have substantially the same characteristics. In other words, first drive circuit 4, second drive circuit 5, third drive circuit 6, and fourth drive circuit 7 are devices for driving pyrotechnic circuit breaker 3, having the same power capacity and being capable of outputting the same voltage and the same current. When entire cutoff device 1 as well as power supply 11 are normally, first drive circuit 4, second drive circuit 5, third drive circuit 6, and fourth drive circuit 7 operate substantially in the same manner, and are capable of supplying first current I1 that is a sum of the output currents of first drive circuit 4, second drive circuit 5, third drive circuit 6, and fourth drive circuit 7, to pyrotechnic circuit breaker 3.

For example, first drive circuit 4, second drive circuit 5, third drive circuit 6, and fourth drive circuit 7 are capable of operating to output power over a substantially matching time period. Even when the periods over which the power is output from first drive circuit 4, second drive circuit 5, third drive circuit 6, and fourth drive circuit 7 are different, first drive circuit 4, second drive circuit 5, third drive circuit 6, and fourth drive circuit 7 may at least have a part where the periods of the power output overlap with one another. In this manner, first drive circuit 4, second drive circuit 5, third drive circuit 6, and fourth drive circuit 7 may at least be collectively capable of outputting first current I1 that is a sum of the outputs therefrom, to pyrotechnic circuit breaker 3.

Control circuit 8 can control the output current and the period for which the output current is output, for each of first drive circuit 4, second drive circuit 5, third drive circuit 6, and fourth drive circuit 7, and each of first drive circuit 4, second drive circuit 5, third drive circuit 6, and fourth drive circuit 7 can be set with a different output current and a different period for which the output current is output. In other words, when a condition that entire cutoff devices 1 as well as power supply 11 are normally are not satisfied, first drive circuit 4, second drive circuit 5, third drive circuit 6, or fourth drive circuit 7 are enabled to supply power to pyrotechnic circuit breaker 3, in a manner suitable for the circumstances. In this manner, it becomes possible to improve the reliability of the operation of cutoff device 1.

It is preferable for first drive circuit 4, second drive circuit 5, third drive circuit 6, and fourth drive circuit 7 to include first power supply circuit 4A, second power supply circuit 5A, third power supply circuit 6A, and fourth power supply circuit 7A, respectively, to which respective output currents and output voltages can be set, as illustrated in FIG. 2. In addition, it is preferable for first drive circuit 4, second drive circuit 5, third drive circuit 6, and fourth drive circuit 7 to include first switch 4B, second switch 5B, third switch 6B, and fourth switch 7B capable of being switched between a disconnected state and a connected state, respectively. First power supply circuit 4A and first switch 4B are preferably connected in series. In the same manner, second power supply circuit 5A and second switch 5B, third power supply circuit 6A and third switch 6B, and fourth power supply circuit 7A and fourth switch 7B are preferably connected in series.

Although a simplified connection diagram is illustrated in FIG. 1, strictly speaking, pyrotechnic circuit breaker 3 is provided with ignition resistor 3C, as illustrated in FIG. 2. First drive circuit 4 then supplies the power to pyrotechnic circuit breaker 3 by causing first power supply circuit 4A that is a constant current power supply to supply constant current to ignition resistor 3C connected to first node 3A and second node 3B, via first switch 4B. First node 3A is connected on a high potential side, and second node 3B is connected on a low potential side. More strictly speaking, first switch 4B is provided with high potential switch 4H that is connected to first node 3A, and with low potential switch 4L that is connected to second node 3B. Control circuit 8 then controls to cause high potential switch 4H and low potential switch 4L to perform the same operation, simultaneously. Alternatively, control circuit 8 may control high potential switch 4H and low potential switch 4L to enter the connected state or to the open state at different timings.

Although FIG. 2 illustrates an example in which high potential switch 4H and low potential switch 4L are provided on the high potential side and the low potential side, respectively, it is also possible to provide only one of high potential switch 4H and low potential switch 4L.

In the same manner, the constant currents supplied by second power supply circuit 5A, third power supply circuit 6A, and fourth power supply circuit 7A, which are constant current power supplies, are supplied to ignition resistor 3C connected to first node 3A and second node 3B via second switch 5B, third switch 6B, and fourth switch 7B, respectively. Each of second switch 5B, third switch 6B, and fourth switch 7B is provided with a high potential switch (not illustrated) connected to first node 3A and a low potential switch (not illustrated) connected to second node 3B, and control circuit 8 controls to cause the high potential switch (not illustrated) and the low potential switch (not illustrated) to perform the same operation simultaneously. In the same manner, it is also possible for each of these switches to be provided only one of the high potential switch (not illustrated) and the low potential switch (not illustrated), without being provided with the high potential switch (not illustrated) on the high potential side and the low potential switch (not illustrated) on the low potential side.

Examples of time not requiring pyrotechnic circuit breaker 3 to be activated may include: immediately after the vehicle 9 is started but without vehicle 9 being driven and propelled; after vehicle 9 is started and vehicle 9 is parked, with the driving propulsion stopped; and while vehicle 9 is being driven and propelled (traveling). Needlessly to say, the time may include immediately before the vehicle 9 is started or stopped. In addition, the diagnosis of the fault and the detection of the voltage may made on the spot basis, or may be made regularly at predetermined intervals.

Control circuit 8 preferably make a diagnosis of a fault in first drive circuit 4, second drive circuit 5, third drive circuit 6, or fourth drive circuit 7 in the following manner.

For example, control circuit 8 may determine a fault based on a potential difference generated in pyrotechnic circuit breaker 3 when a weak current or the like is supplied to pyrotechnic circuit breaker 3 from first drive circuit 4. Control circuit 8 may then sequentially determine a fault in second drive circuit 5, third drive circuit 6, and fourth drive circuit 7, in the same manner.

For example, control circuit 8 may start and enable first power supply circuit 4A to output a weak current at a level not activating pyrotechnic circuit breaker 3, open and close first switch 4B to form a potential difference in pyrotechnic circuit breaker 3, and determine a fault in first drive circuit 4, including first power supply circuit 4A and first switch 4B, based on the potential difference. Control circuit 8 may then sequentially determine faults in second drive circuit 5, third drive circuit 6, and fourth drive circuit 7, following the same procedure.

As another example, control circuit 8 may start and enable a test power supply (not illustrated) provided in first drive circuit 4 in parallel with first power supply circuit 4A to output a weak current at a level not activating pyrotechnic circuit breaker 3, open and close first switch 4B to form a potential difference in pyrotechnic circuit breaker 3, and determine a fault in first drive circuit 4, including first power supply circuit 4A and first switch 4B, based on the potential difference. Control circuit 8 may then sequentially determine faults in second drive circuit 5, third drive circuit 6, and fourth drive circuit 7, following the same procedure.

After control circuit 8 makes the diagnosis of the faults of first drive circuit 4, second drive circuit 5, third drive circuit 6, and fourth drive circuit 7, if control circuit 8 determines that no abnormality or fault is found in the voltages of all the drive circuits including first drive circuit 4, second drive circuit 5, third drive circuit 6, and fourth drive circuit 7, and power supply 11, control circuit 8 executes or prepares for the following control or operation.

Control circuit 8 controls to enable first drive circuit 4, second drive circuit 5, third drive circuit 6, and fourth drive circuit 7 to supply first current I1 to pyrotechnic circuit breaker 3. Control circuit 8 preferably controls to enable each of first drive circuit 4, second drive circuit 5, third drive circuit 6, and fourth drive circuit 7 to output one fourth of first current I1. More specifically, control circuit 8 preferably controls each of first power supply circuit 4A, second power supply circuit 5A, third power supply circuit 6A, and fourth power supply circuit 7A to output one fourth of first current I1, and at the same time, controls to make first switch 4B, second switch 5B, third switch 6B, and fourth switch 7B connectable.

When pyrotechnic circuit breaker 3 needs to be activated, power at first current value I1 is supplied to pyrotechnic circuit breaker 3 for first period T1. Pyrotechnic circuit breaker 3 is then driven by ignition resistor 3C with a local blasting operation or the like, and causes a physical destruction to cut off conductor wire 2 irreversibly.

In other words, when current detector 12 detects an overcurrent exceeding a predetermined current value or detects information of an accident of vehicle 9, at the time point 0 in FIG. 3, control circuit 8 switches first switch 4B, second switch 5B, third switch 6B, and fourth switch 7B to the connected state, and causes each of first power supply circuit 4A, second power supply circuit 5A, third power supply circuit 6A, and fourth power supply circuit 7A to output power at one fourth of first current value I1, so that first current I1 is supplied to pyrotechnic circuit breaker 3 for first period T1. First period T1 may be set to a period during which first switch 4B, second switch 5B, third switch 6B, and fourth switch 7B are in the connected state, or may be set as a period for which first power supply circuit 4A, second power supply circuit 5A, third power supply circuit 6A, and fourth power supply circuit 7A operate to supply first current I1.

In cutoff device 1, when pyrotechnic circuit breaker 3 needs to be activated while control circuit 8 has determined that there is no abnormality or fault in any of first drive circuit 4, second drive circuit 5, third drive circuit 6, and fourth drive circuit 7, all of these drive circuits bear the output currents equally to supply first current I1 to pyrotechnic circuit breaker 3 for the first period T1. In other words, when first drive circuit 4, second drive circuit 5, third drive circuit 6, and fourth drive circuit 7 can ensure stable redundancy when a current output is required. Therefore, the reliability of the operation of cutoff device 1 can be improved.

First switch 4B, second switch 5B, third switch 6B, and fourth switch 7B may be mechanical switches such as relays, or semiconductor wire switches such as field-effect transistors (hereinafter referred to as FETs). As described above, it is preferable to mainly use a constant current power supply for first power supply circuit 4A, second power supply circuit 5A, third power supply circuit 6A, and fourth power supply circuit 7A.

Each of first drive circuit 4, second drive circuit 5, third drive circuit 6, and fourth drive circuit 7 may include first power supply circuit 4A, second power supply circuit 5A, third power supply circuit 6A, and fourth power supply circuit 7A, respectively, each of which is enabled to be set with an output current and an output voltage. In addition, it is preferable for first drive circuit 4, second drive circuit 5, third drive circuit 6, and fourth drive circuit 7 to include first switch 4B, second switch 5B, third switch 6B, and fourth switch 7B capable of being switched between a disconnected state and a connected state, respectively. Furthermore, each of first drive circuit 4, second drive circuit 5, third drive circuit 6, and fourth drive circuit 7 may include first supply wire 4D, second supply wire 5D, third supply wire 6D, and fourth supply wire 7D, respectively, the supply wire being wires via which power is from first power supply circuit 4A, second power supply circuit 5A, third power supply circuit 6A, and fourth power supply circuit 7A to pyrotechnic circuit breaker 3. First power supply circuit 4A and first switch 4B are preferably connected in series. In the same manner, second power supply circuit 5A and second switch 5B, third power supply circuit 6A and third switch 6B, and fourth power supply circuit 7A and fourth switch 7B are preferably connected in series.

Although a simplified connection diagram is illustrated in FIG. 1, strictly speaking, pyrotechnic circuit breaker 3 is provided with ignition resistor 3C, as illustrated in FIG. 2. First drive circuit 4 then supplies the power to pyrotechnic circuit breaker 3 by causing first power supply circuit 4A that is a constant current power supply to supply constant current to ignition resistor 3C connected to first node 3A and second node 3B, via first switch 4B. First node 3A is connected on a high potential side, and second node 3B is connected on a low potential side. More strictly speaking, first switch 4B is provided with high potential switch 4H that is connected to first node 3A, and with low potential switch 4L that is connected to second node 3B. Control circuit 8 then controls to cause high potential switch 4H and low potential switch 4L to perform the same operation, simultaneously. Alternatively, control circuit 8 may control high potential switch 4H and low potential switch 4L to enter the connected state or to the open state at different timings. Although FIG. 2 illustrates an example in which high potential switch 4H and low potential switch 4L are provided on the high potential side and the low potential side, respectively, it is also possible for only one of high potential switch 4H and low potential switch 4L to be provided.

In the same manner, the constant currents supplied by second power supply circuit 5A, third power supply circuit 6A, and fourth power supply circuit 7A, which are constant current power supplies, are supplied to ignition resistor 3C connected to first node 3A and second node 3B via second switch 5B, third switch 6B, and fourth switch 7B, respectively. Each of second switch 5B, third switch 6B, and fourth switch 7B is provided with a high potential switch (not illustrated) connected to first node 3A and a low potential switch (not illustrated) connected to second node 3B, and control circuit 8 controls to cause the high potential switch (not illustrated) and the low potential switch (not illustrated) to perform the same operation simultaneously. In the same manner, it is also possible for each of these switches to be provided only one of the high potential switch (not illustrated) and the low potential switch (not illustrated), without being provided with the high potential switch (not illustrated) on the high potential side and the low potential switch (not illustrated) on the low potential side.

Each of first drive circuit 4, second drive circuit 5, third drive circuit 6, and fourth drive circuit 7 may include first power supply terminal 4C, second power supply terminal 5C, third power supply terminal 6C, and fourth power supply terminal 7C, respectively, for receiving the power required for first drive circuit 4, second drive circuit 5, third drive circuit 6, and fourth drive circuit 7 to operate, from power supply 11.

While activation of pyrotechnic circuit breaker 3 is not needed, control circuit 8 can make a diagnosis of normally or fault in first power supply circuit 4A and first switch 4B included in first drive circuit 4, second power supply circuit 5A and second switch 5B included in second drive circuit 5, third power supply circuit 6A and third switch 6B included in third drive circuit 6, and fourth power supply circuit 7A and fourth switch 7B included in fourth drive circuit 7, and detect a voltage to be supplied to first power supply terminal 4C, second power supply terminal 5C, third power supply terminal 6C, and fourth power supply terminal 7C.

Examples of time not requiring pyrotechnic circuit breaker 3 to be activated may include: immediately after the vehicle 9 is started but without vehicle 9 being driven and propelled; after vehicle 9 is started and vehicle 9 is parked, with the driving propulsion stopped; and while vehicle 9 is being driven and propelled (traveling). Needlessly to say, the time may include immediately before the vehicle 9 is started or stopped. In addition, the diagnosis of the fault and the detection of the voltage may made on the spot basis, or may be made regularly at predetermined intervals.

Preferably, control circuit 8 makes the diagnosis of a fault in first drive circuit 4, second drive circuit 5, third drive circuit 6, and fourth drive circuit 7 in the manner described below.

For example, control circuit 8 may determine a fault based on a potential difference generated in pyrotechnic circuit breaker 3 when a weak current or the like is supplied to pyrotechnic circuit breaker 3 from first drive circuit 4. Control circuit 8 may then sequentially determine a fault in second drive circuit 5, third drive circuit 6, and fourth drive circuit 7, in the same manner.

For example, control circuit 8 may determine a fault in first power supply circuit 4A, a fault in first switch 4B, a fault in first drive circuit 4 including first power supply circuit 4A and first switch 4B, and a fault in first drive circuit 4 including first power supply circuit 4A, first switch 4B, and first supply wire 4D, based on a potential difference generated in pyrotechnic circuit breaker 3 when first power supply circuit 4A is started and enabled to output a weak current at a level not activating pyrotechnic circuit breaker 3, and first switch 4B is opened and closed. Control circuit 8 may then sequentially determine faults in second drive circuit 5, third drive circuit 6, and fourth drive circuit 7, following the same procedure.

As another example, control circuit 8 may start and enable a test power supply (not illustrated) provided in first drive circuit 4 in parallel with first power supply circuit 4A to output a weak current at a level not activating pyrotechnic circuit breaker 3, open and close first switch 4B to form a potential difference in pyrotechnic circuit breaker 3, and determine a fault in first drive circuit 4, including first power supply circuit 4A and first switch 4B, based on the potential difference. Control circuit 8 may then sequentially determine faults in second drive circuit 5, third drive circuit 6, and fourth drive circuit 7, following the same procedure.

Control circuit 8 detects voltages supplied to first power supply terminal 4C, second power supply terminal 5C, third power supply terminal 6C, and fourth power supply terminal 7C, and determines whether the detected voltages are at an appropriate level. In other words, control circuit 8 determines whether power supply 11 outputs an appropriate voltage. For example, control circuit 8 may store first voltage V1 as a preset value, and determine that power supply 11 is in an appropriate condition when the levels of the voltages at first power supply terminal 4C, second power supply terminal 5C, third power supply terminal 6C, and fourth power supply terminal 7C are higher than first voltage V1. The voltages supplied to first power supply terminal 4C, second power supply terminal 5C, third power supply terminal 6C, and fourth power supply terminal 7C are preferably detected at first power supply terminal 4C, second power supply terminal 5C, third power supply terminal 6C, and fourth power supply terminal 7C, respectively. Alternatively, the voltage supplied to first power supply terminal 4C, second power supply terminal 5C, third power supply terminal 6C, and fourth power supply terminal 7C may be detected at power supply terminal 11A of power supply 11.

The determinations for first drive circuit 4, second drive circuit 5, third drive circuit 6, and fourth drive circuit 7 may be made before, after, or simultaneously with the determinations of the voltages at first power supply terminal 4C, second power supply terminal 5C, third power supply terminal 6C, and fourth power supply terminal 7C.

After control circuit 8 makes the fault diagnoses of first drive circuit 4, second drive circuit 5, third drive circuit 6, and fourth drive circuit 7, and determining the voltage levels of first power supply terminal 4C, second power supply terminal 5C, third power supply terminal 6C, and fourth power supply terminal 7C, if control circuit 8 determines that there is no abnormality or fault in the voltages of any of the drive circuits of first drive circuit 4, second drive circuit 5, third drive circuit 6, and fourth drive circuit 7, nor in the voltage of in power supply 11, control circuit 8 executes or prepares for the execution of the following control and operation.

Control circuit 8 controls to enable first drive circuit 4, second drive circuit 5, third drive circuit 6, and fourth drive circuit 7 to supply first current I1 to pyrotechnic circuit breaker 3. Control circuit 8 preferably controls to enable each of first drive circuit 4, second drive circuit 5, third drive circuit 6, and fourth drive circuit 7 to output one fourth of first current I1. More specifically, control circuit 8 preferably controls each of first power supply circuit 4A, second power supply circuit 5A, third power supply circuit 6A, and fourth power supply circuit 7A to output one fourth of first current I1, and at the same time, controls to make first switch 4B, second switch 5B, third switch 6B, and fourth switch 7B connectable.

When pyrotechnic circuit breaker 3 needs to be activated, power at first current value I1 is supplied to pyrotechnic circuit breaker 3 for first period T1. Pyrotechnic circuit breaker 3 is then driven by ignition resistor 3C with a local blasting operation or the like, and causes a physical destruction to cut off conductor wire 2 irreversibly.

In other words, when current detector 12 detects an overcurrent exceeding a predetermined current value or detects information of an accident of vehicle 9, at the time point 0 in FIG. 3, control circuit 8 switches first switch 4B, second switch 5B, third switch 6B, and fourth switch 7B to the connected state, and causes each of first power supply circuit 4A, second power supply circuit 5A, third power supply circuit 6A, and fourth power supply circuit 7A to output power at one fourth of first current value I1, so that first current I1 is supplied to pyrotechnic circuit breaker 3 for first period T1. First period T1 may be set to a period during which first switch 4B, second switch 5B, third switch 6B, and fourth switch 7B are in the connected state, or may be set as a period for which first power supply circuit 4A, second power supply circuit 5A, third power supply circuit 6A, and fourth power supply circuit 7A operate to supply first current I1.

In cutoff device 1, when pyrotechnic circuit breaker 3 needs to be activated while control circuit 8 has determined that there is no abnormality or fault in any of first drive circuit 4, second drive circuit 5, third drive circuit 6, and fourth drive circuit 7, all of these drive circuits bear the output currents equally to supply first current I1 to pyrotechnic circuit breaker 3 for the first period T1. In other words, when first drive circuit 4, second drive circuit 5, third drive circuit 6, and fourth drive circuit 7 can ensure stable redundancy when a current output is required. Therefore, the reliability of the operation of cutoff device 1 can be improved.

First switch 4B, second switch 5B, third switch 6B, and fourth switch 7B may be mechanical switches such as relays, or semiconductor wire switches such as field-effect transistors (hereinafter referred to as FETs). As described above, it is preferable to mainly use a constant current power supply for first power supply circuit 4A, second power supply circuit 5A, third power supply circuit 6A, and fourth power supply circuit 7A.

Second drive circuit group 15Y may be connected to pyrotechnic circuit breaker 3, in parallel with first drive circuit 4, second drive circuit 5, third drive circuit 6, and fourth drive circuit 7. A diagnosis of a fault is not made for second drive circuit group 15Y. Second drive circuit group 15Y is provided with a drive circuit (not illustrated), or a plurality of drive circuits (not illustrated) that are connected in parallel.

In other words, it is not always necessary to make a diagnosis of a fault for all of the plurality of drive circuits connected to pyrotechnic circuit breaker 3 in parallel. The reliability of the operation of cutoff device 1 can be improved by making a diagnosis of faults only on the drive circuits that need to operate, among the entire drive circuits.

Any number of a plurality of drive circuits may be assigned to first drive circuit group 15X and second drive circuit group 15Y described above. FIG. 1 illustrates a configuration in which first drive circuit 4, second drive circuit 5, third drive circuit 6, and fourth drive circuit 7 are assigned to first drive circuit group 15X, as an embodiment. However, the present invention is not limited to first drive circuit group 15X assigned with four drive circuits. For example, first drive circuit group 15X may be assigned with all of drive circuits that are determined to be normally, as a result of a fault diagnosis, or some of the plurality of drive circuits determined to be normally, as a result of a fault diagnosis.

When control circuit 8 detects a fault in a drive circuit, as a result of the diagnosis of the faults in first drive circuit 4, second drive circuit 5, third drive circuit 6, and fourth drive circuit 7, control circuit 8 performs the following operation. For example, when control circuit 8 makes a diagnosis and determines that first drive circuit 4 is faulty, control circuit 8 determines first drive circuit 4 as a faulty drive circuit, and controls to switch first switch 4B to a disconnected state, or causes first power supply circuit 4A not to operate nor to output current. Control circuit 8 then, preferably, determines second drive circuit 5, third drive circuit 6, and fourth drive circuit 7 that are normally as operating drive circuits, and control to make pyrotechnic circuit breaker 3 operable by making these drive circuits operable. Alternatively, control circuit 8 may control to make pyrotechnic circuit breaker 3 operable by making any of the normally second drive circuit 5, third drive circuit 6, and fourth drive circuit 7 operable.

For example, control circuit 8 controls to enable second drive circuit 5, third drive circuit 6, and fourth drive circuit 7 to supply second current I2 to pyrotechnic circuit breaker 3. Control circuit 8 controls, preferably, each of second drive circuit 5, third drive circuit 6, and fourth drive circuit 7 to output one third of second current I2. More specifically, control circuit 8 may control to cause each of second power supply circuit 5A, third power supply circuit 6A, and fourth power supply circuit 7A to output one third of second current I2, and at the same time, control to make second switch 5B, third switch 6B, and fourth switch 7B connectable.

When pyrotechnic circuit breaker 3 needs to be activated, the power at second current value I2 is supplied to pyrotechnic circuit breaker 3 for second period T2. In other words, when current detector 12 detects an overcurrent exceeding a predetermined current or detects information of an accident of vehicle 9, at the time point 0 in FIG. 3, control circuit 8 switches second switch 5B, third switch 6B, and fourth switch 7B to the connected state, and causes each of second power supply circuit 5A, third power supply circuit 6A, and fourth power supply circuit 7A to output one third of second current I2, so that first current I1 is supplied to pyrotechnic circuit breaker 3 for second period T2. Second period T2 may be set as a period during which second switch 5B, third switch 6B, and fourth switch 7B are in the connected state, or may be set as a period during which second power supply circuit 5A, third power supply circuit 6A, and fourth power supply circuit 7A operate to supply second current I2.

As illustrated in FIG. 3, it is preferable for second current value I2 to be lower than first current value I1, and for second period T2 to be longer than the first period T1. To supply first current I1 described above, each of first power supply circuit 4A, second power supply circuit 5A, third power supply circuit 6A, and fourth power supply circuit 7A outputs one fourth of first current I1. At this time, preferably, the value of one fourth of first current I1 is generally equal to an upper limit or in proximity of the upper limit of the current that can be output from first power supply circuit 4A, second power supply circuit 5A, third power supply circuit 6A, and fourth power supply circuit 7A. The value of one third of second current I2 output from each of second drive circuit 5, third drive circuit 6, and fourth drive circuit 7 is a value substantially close to the current that can be output from second power supply circuit 5A, third power supply circuit 6A, and fourth power supply circuit 7A. In order to compensate for second current I2 being a current value obtained by multiplying three fourth to substantial I1 that is smaller than first current I1, the power is supplied to pyrotechnic circuit breaker 3 for second period T2 that is longer than the first period T1. In this manner, the operation of pyrotechnic circuit breaker 3 is performed reliably.

In cutoff device 1, when control circuit 8 determines that first drive circuit 4 is experiencing some abnormality or faulty, and second drive circuit 5, third drive circuit 6, and fourth drive circuit 7 need to activate pyrotechnic circuit breaker 3, second drive circuit 5, third drive circuit 6, and fourth drive circuit 7, which can operate appropriately, bear equal allocations of output current, to supply second current I2 to pyrotechnic circuit breaker 3 for second period T2. In other words, when second drive circuit 5, third drive circuit 6, and fourth drive circuit 7 need to output a current, by causing operable drive circuits to operate, stable redundancy can be ensured. In this manner, it is possible to improve the reliability of the operation of cutoff device 1.

Apart from the above, when control circuit 8 detects some abnormality in the voltage of power supply 11 after making determinations of the voltage levels of first power supply terminal 4C, second power supply terminal 5C, third power supply terminal 6C, and fourth power supply terminal 7C, control circuit 8 performs the following operation. For example, with first voltage V1 being stored in control circuit 8 as a preset value, control circuit 8 determines that power supply 11 is abnormal when the voltage supplied to first power supply terminal 4C, second power supply terminal 5C, third power supply terminal 6C, and fourth power supply terminal 7C is lower than first voltage V1, and control circuit 8 causes all of first drive circuit 4, second drive circuit 5, third drive circuit 6, and fourth drive circuit 7 to operate, but by executing the following control.

Control circuit 8 controls to enable first drive circuit 4, second drive circuit 5, third drive circuit 6, and fourth drive circuit 7 to supply third current I3 to pyrotechnic circuit breaker 3. Control circuit 8 preferably controls to enable each of first drive circuit 4, second drive circuit 5, third drive circuit 6, and fourth drive circuit 7 to output one fourth of third current I3. More specifically, control circuit 8 preferably controls each of first power supply circuit 4A, second power supply circuit 5A, third power supply circuit 6A, and fourth power supply circuit 7A to output one fourth of third current I3, and at the same time, controls to make first switch 4B, second switch 5B, third switch 6B, and fourth switch 7B connectable.

When activation of pyrotechnic circuit breaker 3 becomes necessary, power at third current value I3 is supplied to pyrotechnic circuit breaker 3 for third period T3. In other words, when current detector 12 detects an overcurrent exceeding a predetermined current or detects information of an accident of vehicle 9, at the time point 0 in FIG. 3, control circuit 8 switches first switch 4B, second switch 5B, third switch 6B, and fourth switch 7B to the connected state, and causes each of first power supply circuit 4A, second power supply circuit 5A, third power supply circuit 6A, and fourth power supply circuit 7A to output one fourth of third current I3, so that third current I3 is supplied to pyrotechnic circuit breaker 3 for third period T3. Third period T3 may be set to a period for which first switch 4B, second switch 5B, third switch 6B, and fourth switch 7B are in a connected state, or may be set as a period during which second power supply circuit 5A, first power supply circuit 4A, third power supply circuit 6A, and fourth power supply circuit 7A performs the operation capable of supplying third current I3.

As illustrated in FIG. 3, it is preferable for third current value I3 to be lower than first current value I1, and for third period T3 to be longer than the first period T1. Because the voltage of power supply 11 is abnormal, the power for supplying first current I1 may be low. Therefore, the current value of third current I3 is set smaller than first current I1, to suppress the power to be output. To supply first current I1 described above, each of first power supply circuit 4A, second power supply circuit 5A, third power supply circuit 6A, and fourth power supply circuit 7A outputs one fourth of first current I1. At this time, one fourth of first current I1 is generally equal to the upper limit or in proximity of the current that can be output from first power supply circuit 4A, second power supply circuit 5A, third power supply circuit 6A, and fourth power supply circuit 7A.

By contrast, one fourth of third current I3 output from each of first drive circuit 4, second drive circuit 5, third drive circuit 6, and fourth drive circuit 7, in order to supply third current I3, is lower than one fourth of first current I1. One fourth of third current I3 is generally lower than the upper limit or the proximity of the upper limit of the current that can be output from that first power supply circuit 4A, second power supply circuit 5A, third power supply circuit 6A, and fourth power supply circuit 7A. For example, one fourth of third current I3 is a lower current set by multiplying a predetermined coefficient of 1.0 or less to the upper limit current that can be output from each of first power supply circuit 4A, second power supply circuit 5A, third power supply circuit 6A, and fourth power supply circuit 7A. As described above, control circuit 8 controls to cause first power supply circuit 4A, second power supply circuit 5A, third power supply circuit 6A, and fourth power supply circuit 7A to output different currents between when first current I1 is to be supplied to pyrotechnic circuit breaker 3 and when third current I3 is to be supplied to pyrotechnic circuit breaker 3.

In order to compensate for third current I3 being a current value that is smaller than first current I1, the power is supplied to pyrotechnic circuit breaker 3 for a third period T3 that is longer than the first period T1. In this manner, the operation of pyrotechnic circuit breaker 3 is performed reliably.

In cutoff device 1, when pyrotechnic circuit breaker 3 needs to be activated while the voltage of power supply 11 is determined to be abnormal by control circuit 8, first drive circuit 4, second drive circuit 5, third drive circuit 6, and fourth drive circuit 7 bear equal allocations of the output current to supply third current I3 to pyrotechnic circuit breaker 3 for third period T3. In other words, when output of the current becomes necessary while the voltage of power supply 11 is low, by causing all of first drive circuit 4, second drive circuit 5, third drive circuit 6, and fourth drive circuit 7 to operate with power lower than usual, stable redundancy can be ensured. In this manner, the reliability of the operation of cutoff device 1 can be improved.

As a relationship between second period T2 at second current value I2 and third period T3 at third current value I3 described above, third current value I3 may be greater or smaller than second current value I2, and third period T3 may be set shorter or longer than second period T2.

As described above, second current I2, which is supplied to pyrotechnic circuit breaker 3 when any or some of the drive circuits fails, and third current I3, which is supplied to pyrotechnic circuit breaker 3 when the voltage of power supply 11 is low, are both lower than first current I1, but second current I2 takes a different value depending on the number of faulty drive circuits, and third current I3 takes a different value depending on the degree by which the voltage of power supply 11 has dropped. Therefore, the quantitative relationship between second current I2 and third current I3 does not remain constant. When second current I2 or third current I3 is lower, second period T2 or third period T3 is extended more. In other words, control circuit 8 controls the operation of first drive circuit 4, second drive circuit 5, third drive circuit 6, and fourth drive circuit 7 in such a manner that the integral of the current supplied to pyrotechnic circuit breaker 3 remains constant, for example, as an energy value calculated as a product of the current squared multiplied by the period.

In addition, first voltage V1 serving as a reference when control circuit 8 determines that power supply 11 is abnormal based on the voltage supplied to first power supply terminal 4C, second power supply terminal 5C, third power supply terminal 6C, and fourth power supply terminal 7C may be higher than or equal to a voltage at which first switch 4B, second switch 5B, third switch 6B, fourth switch 7B, first drive circuit 4, second drive circuit 5, third drive circuit 6, and fourth drive circuit 7 are operable. The voltage by which first drive circuit 4, second drive circuit 5, third drive circuit 6, and fourth drive circuit 7 are operable is higher than the voltage at which first switch 4B, second switch 5B, third switch 6B, and fourth switch 7B are operable, particularly when operations such as a power conversion are involved. Therefore, first voltage V1 serving as a reference in making the determination may be set to a voltage higher than or equal to that at which first drive circuit 4, second drive circuit 5, third drive circuit 6, and fourth drive circuit 7 are operable.

Furthermore, it is also possible to provide current detector 12 capable of detecting a load current flowing through conductor wire 2, and to use current detector 12 as a function for transmitting a trigger for activating pyrotechnic circuit breaker 3.

As described above, to address an unordinary condition, such as upon detection of an overcurrent or detection of a collision of vehicle 9, pyrotechnic circuit breaker 3 performs a cutoff operation using the power supplied from each of the drive circuits, in response to an instruction from control circuit 8. For example, when control circuit 8 determines that the load current flowing through conductor wire 2 exceeds an overcurrent threshold, control circuit 8 may determine that pyrotechnic circuit breaker 3 needs to be activated, and cause pyrotechnic circuit breaker 3 to execute a cutoff operation.

It becomes thus possible to improve the reliability of the operation of the cutoff device 1. When it is determined that an overcurrent is being applied, control circuit 8 instructs to perform the cutoff operation.

In addition, when control circuit 8 detects a fault in a drive circuit in the diagnosis of the faults in first drive circuit 4, second drive circuit 5, third drive circuit 6, and fourth drive circuit 7, control circuit 8 may execute the following operation. When control circuit 8 makes a diagnosis and determines that first drive circuit 4 is faulty, control circuit 8 controls to switch first switch 4B to a disconnected state, or controls not to cause first power supply circuit 4A to operate nor to output current. Preferably, control circuit 8 controls to enable each of second drive circuit 5, third drive circuit 6, and fourth drive circuit 7 to output one fourth of first current I1 to pyrotechnic circuit breaker 3.

As described above, first current I1 is the current supplied to cause pyrotechnic circuit breaker 3 to operate when all of the drive circuits can output current appropriately. At that time, because the drive circuit includes first drive circuit 4, second drive circuit 5, third drive circuit 6, and fourth drive circuit 7, as described in the example, control circuit 8 controls to enable each of the drive circuits to output one fourth of first current I1.

It is preferable for each of second drive circuit 5, third drive circuit 6, and fourth drive circuit 7, which are individual drive circuits that are operable, to supply current at one fourth of first current I1 for fourth period T4 that is longer than the first period, the first current I1 being a current having the same value as the first current value having been supplied to pyrotechnic circuit breaker 3, when pyrotechnic circuit breaker 3 needs to be activated. By causing operable drive circuits to operate, cutoff device 1 can ensure reliability of the operation, reliably.

Alternatively, it is preferable for each of second drive circuit 5, third drive circuit 6, and fourth drive circuit 7, which are individual operable drive circuits, to supply fourth current I4 to pyrotechnic circuit breaker 3 for the first period, fourth current I4 being is a current having a value greater than that of one fourth of first current value I1 having been supplied to pyrotechnic circuit breaker 3, when pyrotechnic circuit breaker 3 needs to be activated. By causing operable drive circuits to operate, cutoff device 1 can ensure reliability of the operation, reliably.

Furthermore, it is preferable for second drive circuit 5, third drive circuit 6, and fourth drive circuit 7, which are individual operable drive circuits to supply fourth current I4 to pyrotechnic circuit breaker 3 for fifth period T5 that is longer than the first period, fourth current I4 being a current having a value greater than that of one fourth of first current I1 having been supplied to pyrotechnic circuit breaker 3 when pyrotechnic circuit breaker 3 needs to be activated. By causing operable drive circuits to operate, cutoff device 1 can ensure reliability of the operation, reliably.

Furthermore, it is also possible to provide current detector 12 capable of detecting a load current flowing through conductor wire 2, and temperature detector 14 capable of detecting the temperature of conductor wire 2 or relay 13 connected to conductor wire 2, and to use current detector 12 and temperature detector 14 as the function for transmitting a trigger for activating pyrotechnic circuit breaker 3.

As described above, to address an unordinary condition, such as upon detection of an overcurrent or detection of a collision of vehicle 9, pyrotechnic circuit breaker 3 performs a cutoff operation using the power supplied from each of the drive circuits, in response to an instruction from control circuit 8. For example, temperature detector 14 transmits the temperature information of conductor wire 2 or relay 13 connected to conductor wire 2 to control circuit 8. Control circuit 8 may then determine that pyrotechnic circuit breaker 3 needs to be activated, and cause pyrotechnic circuit breaker 3 to execute the cutoff operation, when the load current flowing through conductor wire 2 exceeds the overcurrent threshold, or when control circuit 8 determines that a rise of temperature in relay 13 exceeds a threshold and has reached an abnormal temperature or higher, due to a load current flowing through conductor wire 2, application of an overcurrent to relay 13, or malfunctioning of relay 13.

Control circuit 8 may determine that pyrotechnic circuit breaker 3 needs to be activated, and cause pyrotechnic circuit breaker 3 to execute the cutoff operation, when the load current flowing through conductor wire 2 exceeds the overcurrent threshold, and control circuit 8 determines that the amount of increase in the temperature of relay 13 exceeds a threshold and has reached an abnormal level, due to the load current flowing through conductor wire 2, an overcurrent being applied to relay 13, or malfunctioning of relay 13. It becomes thus possible to improve the reliability of the operation of the cutoff device 1.

When either one of the overcurrent application and the temperature rise is determined, control circuit 8 instructs the execution of the cutoff operation. Alternatively, when both of the overcurrent application and the temperature rise are determined control circuit 8 instructs the execution of the cutoff operation.

When control circuit 8 determines an overcurrent due to a noise generated in starting vehicle 9, for example, such an overcurrent may be established as a condition for not executing the cutoff operation.

Explained in the embodiment described above is an example of a configuration in which the four drive circuits including first drive circuit 4, second drive circuit 5, third drive circuit 6, and fourth drive circuit 7 that are arranged in parallel as a plurality of drive circuits can supply power to pyrotechnic circuit breaker 3. However, the present disclosure is not limited to the configuration in which four drive circuits are arranged in parallel, and the configuration of the plurality of drive circuits may have any configuration as long as two or more drive circuits are arranged in parallel.

Explained in the description above is an example in which control circuit 8 is an element that instructs and executes all of the operations and control related to the determination. Strictly speaking, control circuit 8 may include, for example, ignition signal output unit 8A for causing first drive circuit 4, second drive circuit 5, third drive circuit 6, and fourth drive circuit 7 to operate, or fault diagnosis unit 8B for making a diagnosis of the fault in first drive circuit 4, second drive circuit 5, third drive circuit 6, and fourth drive circuit 7. In addition, control circuit 8 may also include a storage device (not illustrated). Control circuit 8 is also not limited to a configuration as a single element, and each of the functions may be distributed.

INDUSTRIAL APPLICABILITY

The cutoff device according to the present disclosure has an effect for improving the reliability of the operation, and is useful in various electric devices for vehicles.

REFERENCE MARKS IN THE DRAWINGS

1: cutoff device
2: conductor wire
3: pyrotechnic circuit breaker
3A: first node
3B: second node
3C: ignition resistor
4: first drive circuit
4A: first power supply circuit
4B: first switch
4C: first power supply terminal
4D: first supply wire
4H: high potential switch
4L: low potential switch
5: second drive circuit
5A: second power supply circuit
5B: second switch
5C: second power supply terminal
5D: second supply wire
6: third drive circuit
6A: third power supply circuit
6B: third switch
6C: third power supply terminal
6D: third supply wire
7: fourth drive circuit
7A: fourth power supply circuit
7B: fourth switch
7C: fourth power supply terminal
7D: fourth supply wire
8: control circuit
8A: ignition signal output unit
8B: fault diagnosis unit
9: vehicle
10: vehicle body
11: power supply
12: current detector
13: relay
14: temperature detector
15X: first drive circuit group
15Y: second drive circuit group

The invention claimed is:

1. A cutoff device comprising:
a conductor wire;
a pyrotechnic circuit breaker configured to cut off the conductor wire irreversibly;
a first drive circuit group including a plurality of drive circuits connected to the pyrotechnic circuit breaker in parallel, and configured to supply power for activating the pyrotechnic circuit breaker; and
a control circuit configured to control operations of the plurality of drive circuits, wherein the control circuit is configured:
when the pyrotechnic circuit breaker needs to be activated, to control an output current value and a period for which the output current is output, for each one of the plurality of drive circuits; and
to cause the first drive circuit group to supply the power for activating the pyrotechnic circuit breaker.

2. The cutoff device according to claim 1, wherein
the control circuit makes a diagnosis whether the plurality of drive circuits are normal or faulty while the pyrotechnic circuit breaker does not need to be activated, and
when the control circuit makes a diagnosis that all of the plurality of drive circuits in the first drive circuit group are normal and then activation of the pyrotechnic circuit breaker becomes needed, power at a first current value is supplied to the pyrotechnic circuit breaker for a first period.

3. The cutoff device according to claim 1, wherein
each of the plurality of drive circuits includes a power supply terminal receiving power supply required for each of the drive circuits to operate, and is configured to switch to supply and not to supply power to the pyrotechnic circuit breaker,
the control circuit is configured to make a diagnosis whether the plurality of drive circuits are normal or faulty, and to detect a voltage supplied to the power supply terminal, while the pyrotechnic circuit breaker does not need to be activated, and
when the activation of the pyrotechnic circuit breaker becomes needed after the control circuit makes a diagnosis that all of the plurality of drive circuits in the first drive circuit group are normal and detects that the voltage supplied to the power supply terminal is higher than or equal to a first voltage value, power at a first current value is supplied to the pyrotechnic circuit breaker for a first period.

4. The cutoff device according to claim 3, further comprising a second drive circuit group connected to the pyrotechnic circuit breaker in parallel with the plurality of drive circuits, wherein
no diagnosis of a fault is made on the second drive circuit group.

5. The cutoff device according to claim 3, wherein, when the first drive circuit group includes a faulty drive circuit diagnosed as faulty, the faulty drive circuit is caused not to output the power when the pyrotechnic circuit breaker needs to be activated, and a normal drive circuit diagnosed as normal, among the plurality of drive circuits, is caused to supply the power to the pyrotechnic circuit breaker when the pyrotechnic circuit breaker needs to be activated.

6. The cutoff device according to claim 3, wherein
when the first drive circuit group includes a faulty drive circuit diagnosed as faulty, the control circuit causes the faulty drive circuit not to output power when the pyrotechnic circuit breaker needs to be activated, and a normal drive circuit diagnosed as normal, among the plurality of drive circuits, is caused to supply power at a second current value that is lower than the first current value to the pyrotechnic circuit breaker for a second period longer than the first period, when the pyrotechnic circuit breaker needs to be activated.

7. The cutoff device according to claim 3, wherein, when the control circuit detects that the voltage being supplied to the power supply terminal is lower than a first voltage value, and when the activation of the pyrotechnic circuit breaker becomes needed, power at a current value lower than the first current value is supplied to the pyrotechnic circuit breaker for a period longer than the first period.

8. The cutoff device according to claim 3, wherein
the control circuit is configured to make a diagnosis whether the plurality of drive circuits are normal or faulty, and to detect a voltage supplied to the power supply terminal, while the pyrotechnic circuit breaker does not need to be activated, and
when the activation of the pyrotechnic circuit breaker becomes needed after the control circuit makes a diagnosis that all of the plurality of drive circuits are normal and detects that the voltage supplied to the power supply terminal is higher than or equal to a first voltage value, the plurality of drive circuits operate to supply the power at the first current value to the pyrotechnic circuit breaker for the first period.

9. The cutoff device according to claim 8, further comprising a second drive circuit group connected to the pyrotechnic circuit breaker in parallel with the first drive circuit group, wherein
no diagnosis of a fault is made on the second drive circuit group.

10. The cutoff device according to claim 1, wherein
each of the plurality of drive circuits includes a power supply circuit including a power supply terminal receiving power supply required for each of the plurality of drive circuits to operate, a supply wire, and a switch configured to switch to supply and not to supply power to the pyrotechnic circuit breaker,
the control circuit is configured to make a diagnosis whether the power supply circuit, the supply wire, and the switch in each of the plurality of drive circuits are all normal or faulty, and to detect a voltage supplied to the power supply terminal, while the pyrotechnic circuit breaker does not need to be activated, and
when the activation of the pyrotechnic circuit breaker becomes needed, after the control circuit makes a diagnosis that all of the power supply circuit, the supply wire, and the switch in each of the plurality of drive circuits in the first drive circuit group are normal, and detects that the voltage supplied to the power supply terminal is higher than or equal to a first voltage value, power at a first current value is supplied to the pyrotechnic circuit breaker for a first period.

11. The cutoff device according to claim 1, further comprising a current detector configured to detect a load current flowing through the conductor wire, wherein
the current detector is connected to the control circuit, and
the control circuit determines that the pyrotechnic circuit breaker needs to be activated when the load current rises above a threshold.

12. The cutoff device according to claim 1, further comprising:
a current detector configured to detect a load current flowing through the conductor wire; and a temperature detector configured to detect a temperature of the conductor wire or a temperature of a switch connected to the conductor wire, wherein the current detector and the temperature detector are both connected to the control circuit, and the control circuit determines that the pyrotechnic circuit breaker needs to be activated when either the load current or the temperature rises above a threshold.

13. The cutoff device according to claim 1, further comprising:

a current detector configured to detect a load current flowing through the conductor wire; and a temperature detector configured to detect a temperature of the conductor wire or a temperature of a switch connected to the conductor wire, wherein the current detector and the temperature detector are both connected to the control circuit, and the control circuit determines that the pyrotechnic circuit breaker needs to be activated when both the load current and the temperature rise above a threshold.

* * * * *